United States Patent
Kang (10) Patent No.: US 8,049,665 B1
(45) Date of Patent: Nov. 1, 2011

(54) SYSTEM AND METHOD FOR SELECTING A LOCAL C/A CODE FOR GPS SIGNAL PROCESSING

(75) Inventor: Inchul Kang, Los Gatos, CA (US)

(73) Assignee: Inchul Kang, Los Gatos, CA (US)

( * ) Notice: Subject to any disclaimer, the term of this patent is extended or adjusted under 35 U.S.C. 154(b) by 580 days.

(21) Appl. No.: 12/358,104

(22) Filed: Jan. 22, 2009

Related U.S. Application Data (63) Continuation-in-part of application No. 11/956,307, filed on Dec. 13, 2007, now Pat. No. 7,782,252, application No. 12/358,104.

(60) Provisional application No. 60/941,653, filed on Jun. 2, 2007, provisional application No. 61/024,046, filed on Jan. 28, 2008.

(51) Int. Cl.
*G01S 19/37* (2010.01)

(52) U.S. Cl. .................................................. 342/357.77

(58) Field of Classification Search ... 342/357.2–357.78
See application file for complete search history.

(56) References Cited

U.S. PATENT DOCUMENTS

| | | |
|---|---|---|
| 5,781,156 A | 7/1998 | Krasner |
| 5,897,605 A | 4/1999 | Kohli et al. |
| 5,960,033 A | 9/1999 | Shibano et al. |
| 6,028,883 A | 2/2000 | Tiemann et al. |
| 6,104,340 A | 8/2000 | Krasner |
| 6,118,808 A * | 9/2000 | Tiemann et al. ............... 375/142 |
| 6,330,274 B1 | 12/2001 | Uehara |
| 6,526,322 B1 | 2/2003 | Peng et al. |
| 6,590,525 B2 | 7/2003 | Yule et al. |
| 6,891,880 B2 | 5/2005 | Abraham |
| 6,891,884 B1 | 5/2005 | Ohnishi |
| 6,917,329 B2 | 7/2005 | Dougherty |
| 7,782,252 B2 * | 8/2010 | Kang ........................ 342/357.42 |
| 2003/0128746 A1 | 7/2003 | Lerner et al. |
| 2004/0122881 A1 | 6/2004 | Mattos et al. |
| 2006/0023776 A1 * | 2/2006 | Hsu ................................ 375/150 |
| 2009/0289841 A1 | 11/2009 | Nakamoto et al. |

* cited by examiner

*Primary Examiner* — Thomas Tarcza
*Assistant Examiner* — Nga X Nguyen
(74) *Attorney, Agent, or Firm* — Clifford B. Perry

(57) ABSTRACT

A method for selecting a local C/A code for GPS signal processing includes performing an autocorrelation of a received GPS C/A code with a plurality of versions of a local coarse acquisition (C/A) code. In such an autocorrelation, each local C/A code version is autocorrelated with the received GPS C/A code over a plurality of autocorrelation periods, and an autocorrelation result is generated for each autocorrelation period. A maximum autocorrelation result and a minimum autocorrelation result are determined from among the autocorrelation results of each C/A code version. Next, one of the local C/A code versions is selected based upon that version's maximum autocorrelation result and the minimum autocorrelation result.

22 Claims, 7 Drawing Sheets

Prior Art

SYSTEM AND METHOD FOR SELECTING A LOCAL C/A CODE FOR GPS SIGNAL PROCESSING

CROSS REFERENCE TO RELATED APPLICATIONS

This application claims the benefit of priority of each of the following U.S. applications:

U.S. application Ser. No. 11/956,307 filed Dec. 13, 2007, which claims the benefit of priority from U.S. provisional Application No. 60/941,653, filed Jun. 2, 2007; and U.S. Provisional Appl. No. 61/024,046, filed Jan. 28, 2008.

Each of the aforementioned applications is incorporated herein by reference in its entity for all purposes.

FIELD OF THE INVENTION

The present invention relates in general to spread-spectrum systems and more particularly to systems and methods for selecting a coarse acquisition (C/A) code for use in Global Position System signal processing.

BACKGROUND

The Global Positioning System (GPS) is a global navigation system made up of a constellation of orbiting navigation satellites receivers. A GPS receiver uses signals received from three or more of the GPS satellites to determine navigational data, such as position and velocity. The GPS receiver is able to determine position and speed information by computing the relative times of arrival of the GPS signals that are simultaneously transmitted from a multiplicity of GPS satellites.

Each satellite transmits its navigation message with at least two distinct spread spectrum codes: a publicly available Coarse/Acquisition (C/A) code, and a Precise (P) code, which is usually encrypted and reserved for military applications. The C/A code is a 1,023 chip pseudo-random code having a repetition period of 1 millisecond. Each satellite transmits its own C/A code on a GPS carrier band L1 (1.57542 GHz), so that it can be uniquely identified and received separately from the other satellites transmitting on the same frequency.

Figure 1:
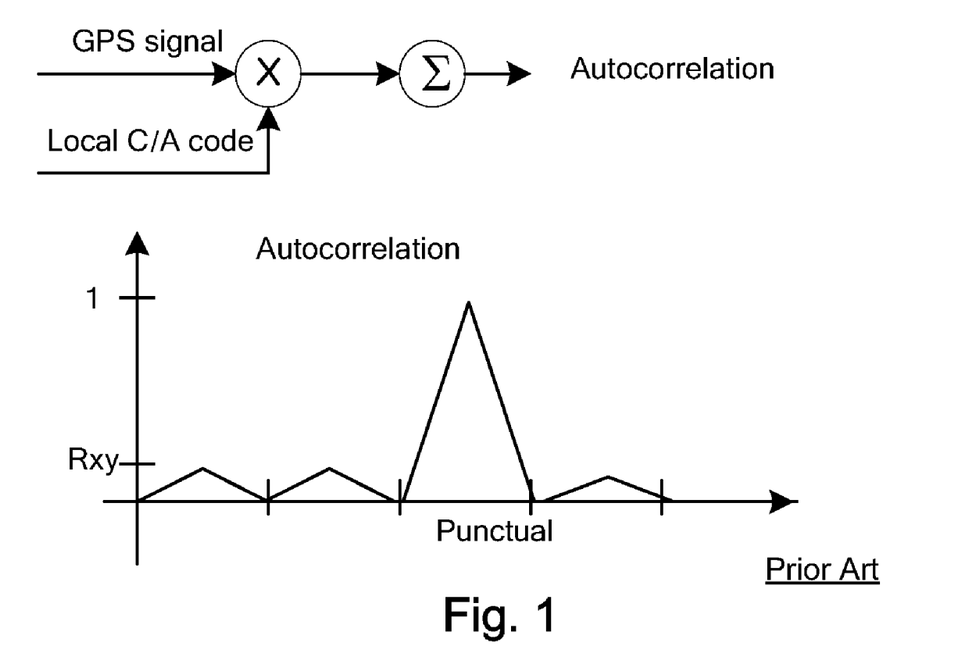
FIG. 1 illustrates an autocorrelation response of conventional GPS system for a present and punctual GPS signal relative to a local C/A code as known in the art.

The presence of a GPS signal is detected by autocorrelation of the C/A code of the received GPS signal with the locally-generated or "local" C/A code in the GPS receiver. If the received GPS C/A code is present and punctual with the local C/A code, the autocorrelation result will be at the triangular peak as shown on FIG. 1. However, if the received GPS signal C/A code is not punctual with the local C/A code, or if the received GPS signal strength is weak and/or the random noise riding on the GPS signal is dominant, such triangular shape won't be observed.

One way to improve GPS receiver sensitivity is to double the autocorrelation period. Such a technique will improve the autocorrelation quality by 3 dB, as the correlated signal gains 3 dB in power while the uncorrelated noise does not. This lengthening autocorrelation process to increase the GPS receiver sensitivity is commonly adopted in most GPS receivers, but it requires the local oscillator to be in synchronization with the received GPS carrier frequency for the best result.

Another method used to enhance receiver sensitivity of the GPS signal is called AGPS (Assisted GPS) that gets assistance from another communication link, typically a cellular network, to acquire the GPS signal. This method provides increased sensitivity to address operation indoors and in urban canyons, but demands expensive propositions for the cellular operators, handset manufacturers and GPS users. In particular, cellular operators are typically required to upgrade the existing network to support AGPS, handset manufacturers must add a GPS device in limited space, and the GPS users must pay the usage for the expensive cellular bands.

What is therefore needed is an alternative technique and system which provides increased GPS signal sensitivity and which does not suffer from the aforementioned disadvantages.

SUMMARY

The present invention provides for a system and method for selecting a local coarse acquisition code for GPS signal processing which operates to establish lock with the GPS signal C/A code at a faster rate and with less power consumption.

In a particular embodiment, a method for selecting a local C/A code for GPS signal processing includes performing an autocorrelation of a received GPS C/A code with a plurality of versions of a local coarse acquisition (C/A) code. In such an autocorrelation, each local C/A code version is autocorrelated with the received GPS C/A code over a plurality of autocorrelation periods, and an autocorrelation result is generated for each autocorrelation period. A maximum autocorrelation result and a minimum autocorrelation result are determined from among the autocorrelation results of each C/A code version. Next, one of the local C/A code versions is selected based upon that version's maximum autocorrelation result and the minimum autocorrelation result.

These and other features of the invention will be better understood in view of the following drawings and detailed description of exemplary embodiments.

BRIEF DESCRIPTION OF THE DRAWINGS

For clarity, reference indicia of previously presented features are retained in subsequent drawings.

DETAILED DESCRIPTION OF EXEMPLARY EMBODIMENTS

Figure 2:
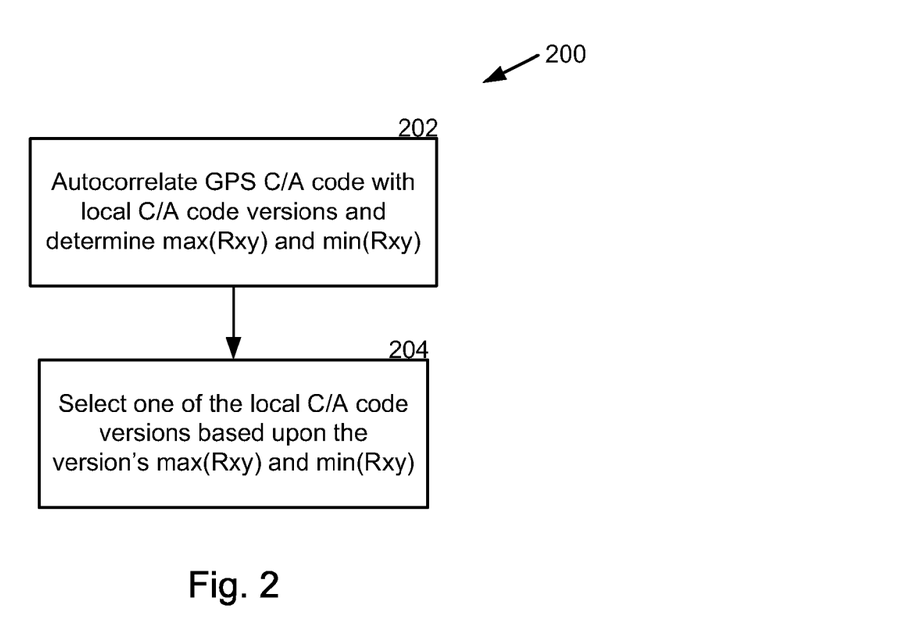
FIG. 2 illustrates a method for selecting a coarse acquisition code for GPS signal processing in accordance with one embodiment of the present invention.

FIG. 2 illustrates a method 200 for selecting a coarse acquisition code for GPS signal processing in accordance with one embodiment of the present invention. At 202, a received GPS C/A code is autocorrelated with a plurality of versions of a local coarse acquisition code. In a particular embodiment, the received GPS C/A code is a 1,023 chip pseudo-random code modulated on an L1 frequency GPS carrier signal operating at 1.57542 GHz, each chip having a frame size of 1 millisecond. Different versions of the local C/A code are generated by shifting (e.g., circularly) the local C/A code by a predefined number of chips, for example, 0.1, 0.25, 0.5, 0.6, 0.75, 1, 2, 3, 4, 5, 10, 20, 100, 500, or more chips. Further exemplary, the number of local C/A versions is 1,023, although any number of versions may be implemented, for example, 2, 3, 4, 5, 8, 10, 16, 20, 32, 50, 64, 100, 128, 200, 256, 500, 512, 1,000, 10,000, 100,000, 1 million, or more versions of the local C/A code. Further, the term "local" as used in "local C/A code" is used to distinguish this C/A code from the received GPS C/A code which is generated remotely, typically on board of a satellite. The local C/A code may be generated within the GPS receiver system, or it may be generated externally to the GPS system, but in each case it is generated locally relative to the received GPS C/A code.

In 202, each local C/A code version is autocorrelated with the received GPS C/A code over a plurality of autocorrelation periods T, whereby an autocorrelation result Rxy is generated for each autocorrelation period T, and whereby, from among the autocorrelation results Rxy of each C/A code version, a maximum autocorrelation result max(Rxy) and a minimum autocorrelation result min(Rxy) is determined for each autocorrelated local C/A code version. In a particular embodiment, the number of autocorrelations is 1,023, and the duration of each autocorrelation period T is 1 millisecond (mS), although any number of autocorrelations and/or autocorrelation periods T may be implemented. For example, the autocorrelation at 202 may involve 4,092 autocorrelations with a corresponding reduction in autocorrelation step size to ¼ of the code (each autocorrelation period T being 250 microseconds), thereby providing 4 times the accuracy of 1,023 autocorrelation. In this manner, the number of autocorrelations can be increased to 10,000, 100,000, 1 million, or higher (or decreased to 500 or 250 autocorrelations) to provide an even greater degree (or a lesser degree) of accuracy. The duration of each autocorrelation period T will correspond to the increased number (or decreased number) of partial frame autocorrelations, e.g., 100 µS, 10 µS, 1 µS (or multiple frame autocorrelations 2 mS or 4 mS) in the foregoing examples.

At 204, one of the plurality of the local C/A code versions is selected based upon its maximum autocorrelation result max(Rxy) and the minimum autocorrelation result min(Rxy). In a specific embodiment, the maximum and minimum autocorrelation results for a particular C/A code version are used to compute an autocorrelation value for the particular C/A code version. Exemplary, operation 204 is performed by selecting one of the plurality of local C/A code versions based upon the difference between that version's maximum and minimum autocorrelation values. In one example of this operation further described below, the autocorrelation value is an autocorrelation difference value computed as a difference between the maximum and minimum autocorrelation results. In another example of this operation also described below, the autocorrelation value is an autocorrelation variance value that is computed as a function of the difference between the maximum and minimum autocorrelation results. More generally, the autocorrelation value may be defined as an arithmetic/mathematic quantity which is based upon the maximum and minimum autocorrelation results.

The selected local C/A code version is used for further processing of the received GPS signal. In the illustrated embodiment in which the number of local C/A code versions is 1,023, the post-acquisition processes may include refining the acquisition timing precision with a smaller autocorrelation step size. The GPS arrival time can be refined by reducing the autocorrelation step size, $\tau$ in Rxy(t−$\tau$) by an amount which is much smaller than one code chip duration. An exemplary embodiment of this process is disclosed in U.S. patent application Ser. No. 11/956,307 filed Dec. 13, 2007, with particular reference made to paragraph [0061] and FIGS. 17 and 18 therein, as well as the corresponding paragraphs therefore.

Figure 3:
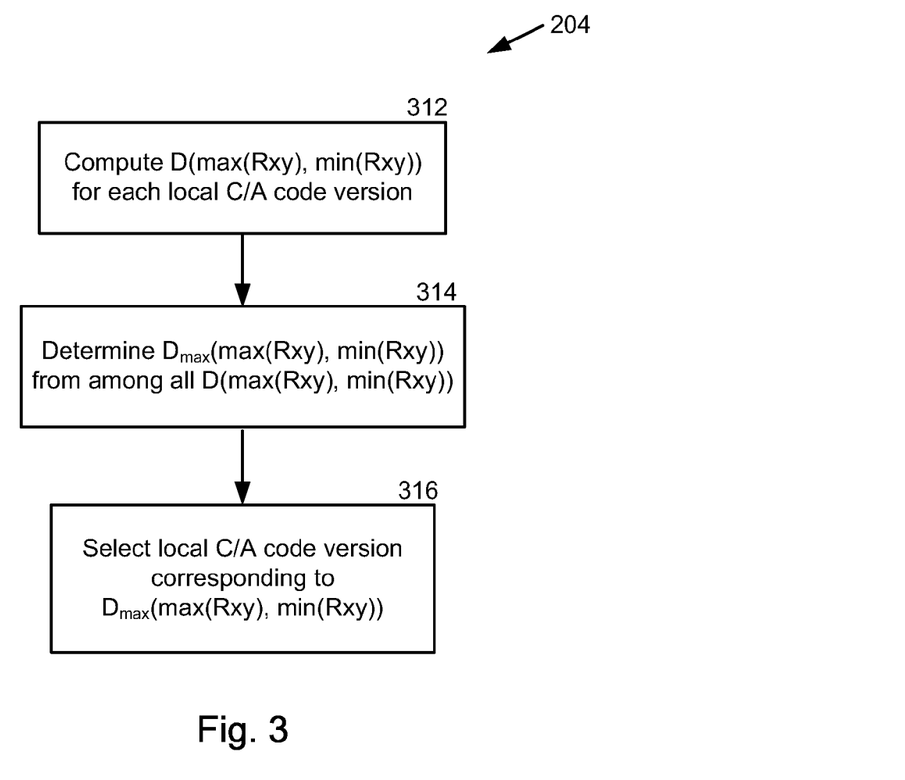
FIG. 3 illustrates a first embodiment of selecting one of a plurality of coarse acquisition code versions shown in FIG. 2.

FIG. 3 illustrates a first embodiment of operation 204 for selecting one of a plurality of coarse acquisition code versions shown in FIG. 2. At 312, an autocorrelation difference value $\Delta(\max(Rxy), \min(Rxy))$ is computed for each local C/A code version that is autocorrelated with the received GPS C/A code. Each autocorrelation difference value $\Delta(\max(Rxy), \min(Rxy))$ of a particular local C/A code version defines a difference between the maximum and minimum autocorrelation values of the particular local C/A code version, and a plurality of autocorrelation difference values are computed corresponding to a respective plurality of local C/A code versions.

At 314, a largest autocorrelation difference value $\Delta_{max}(\max(Rxy), \min(Rxy))$ is determined from among the plurality of autocorrelation difference values. Exemplary, this determination is made by comparing the magnitude of the autocorrelation difference values. At 316, the local C/A code version corresponding to the largest autocorrelation difference value $\Delta_{max}(\max(Rxy), \min(Rxy))$ is selected as the local C/A code version for processing the GPS signal.

Figure 4A:
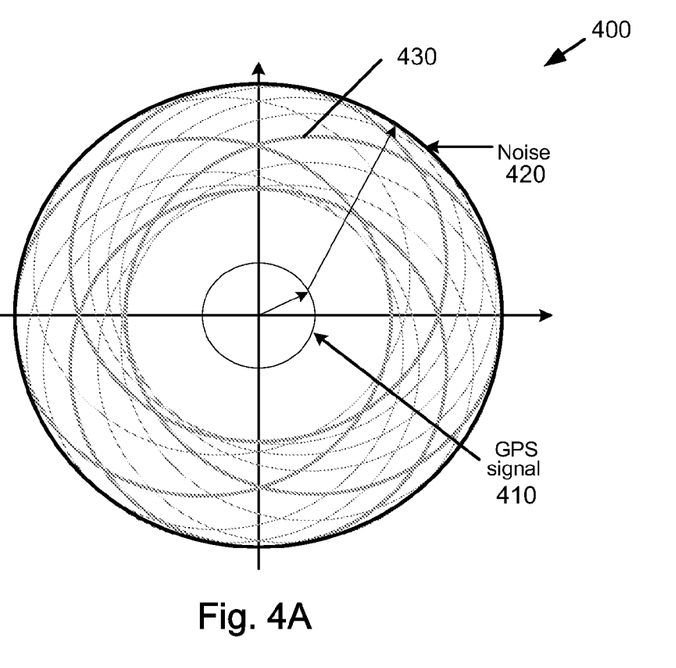
FIG. 4A illustrates a phasor diagram representing GPS carrier to noise ration.

FIG. 4A illustrates a phasor diagram 400 representing GPS carrier to noise ration. An inner circumference 410 represents the magnitude of the GPS signal, and an outer circumference 420 represents the magnitude of the GPS signal and carrier noise collectively. The phasor diagram 400 further includes inner traces 430 within the outer circumference 420 which represents the collective magnitude of the GPS signal and carrier noise at varying degrees of frequency offset (i.e., Doppler shift) of the GPS carrier signal.

Figure 4B:
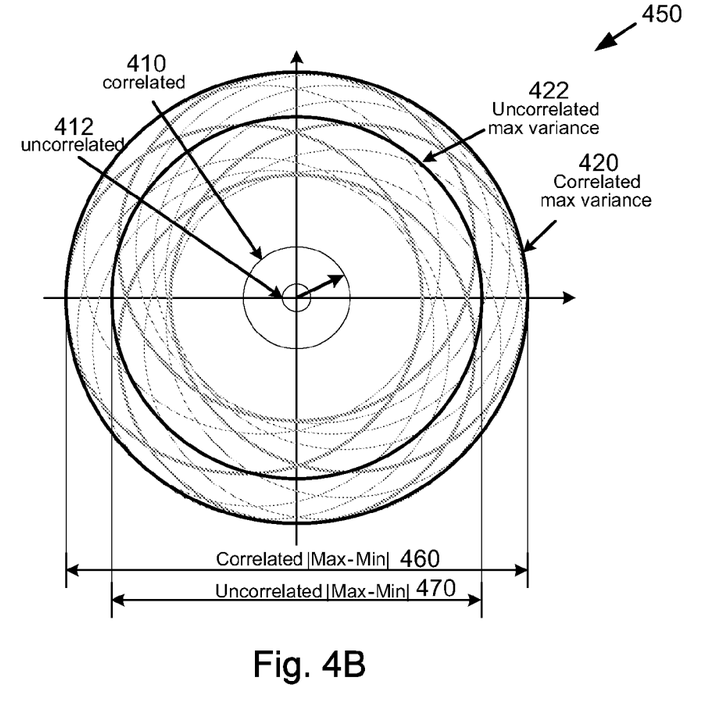
FIG. 4B illustrates the phasor diagram of FIG. 4A in which autocorrelation difference values are depicted.

FIG. 4B illustrates the phasor diagram 450 of FIG. 4A in which autocorrelation difference values are depicted Inner circumference 410 represents the magnitude of the received GPS signal when highly/exactly correlated with a local C/A code version, and inner circumference 412 represents the magnitude of the received GPS signal when the received GPS signal is weakly/uncorrelated with said local C/A code version. Circumference 420 represents the magnitude of the received GPS signal and carrier noise when highly correlated with the local C/A code version, and circumference 422 represents the received GPS signal+carrier noise when it is weakly correlated to the local C/A code version to which it is autocorrelated.

In particular, when the received GPS C/A code are used for all autocorrelations with the local C/A code versions, the cross-correlated noise with the local C/A code is strongly correlated, as the same noise samples are used in each of the autocorrelations. If the autocorrelation of the received GPS C/A code with a ΔT-delayed local C/A code (i.e., C/A code (t−ΔnT)) is punctual, then the absolute difference 460 between the minimum and maximum autocorrelation peaks therefore will be higher than the absolute difference 470 between minimum and maximum autocorrelation peaks for non-punctual local C/A code versions relative to the received GPS signal.

In an exemplary embodiment, a snap-shot of a received GPS signal (with uncorrelated and independent noise) is autocorrelated with a local C/A, where the remoted C/A code of the received GPS signal is X(t), the GPS signal noise is n(t), and the local C/A code is X(t−τ):

$$E\{(X(t)+n(t))*X(t-\tau)\} =$$
$$E\{X(t)X'(t)+n(t)X(t-\tau)\} = E\{X(t)X(t-\tau)\} + E\{n(t)X(t-\tau)\}$$

where the normalized autocorrelation:

$E\{X(t)X'(t-\tau)\}=\sim 0$, if $\tau \neq 0$ (non-punctual), or 1, if $\tau=0$ (punctual)

$E\{n(t)X(t-\tau)\}=0$ (GPS signal noise is uncorrelated with the local C/A code)

Accordingly:

$E\{(X(t)+n(t))X'(t)\} > E\{(X(t)+n(t))X'(t-\tau)\}$ when $\tau \neq 0$

Further, for a correlation:

$E\{X(t)X'(t)\} > E\{X(t)X'(t-\tau)\}$, without a loss of generality:

$E\{(X(t)+n(t))X'(t)\} > E\{(X(t)+n(t))X'(t-\tau)\}$ where $\tau \neq 0$ (non-punctual), and $E\{n(t)X'(t)\} = E\{n(t)X'(t-\tau)\}$.

Accordingly, it can be seen that the correlation dynamics of the autocorrelation property, e.g., absolute value of (maximum−minimum), is larger when the local C/A code matches with the received GPS C/A code.

Figure 5A:
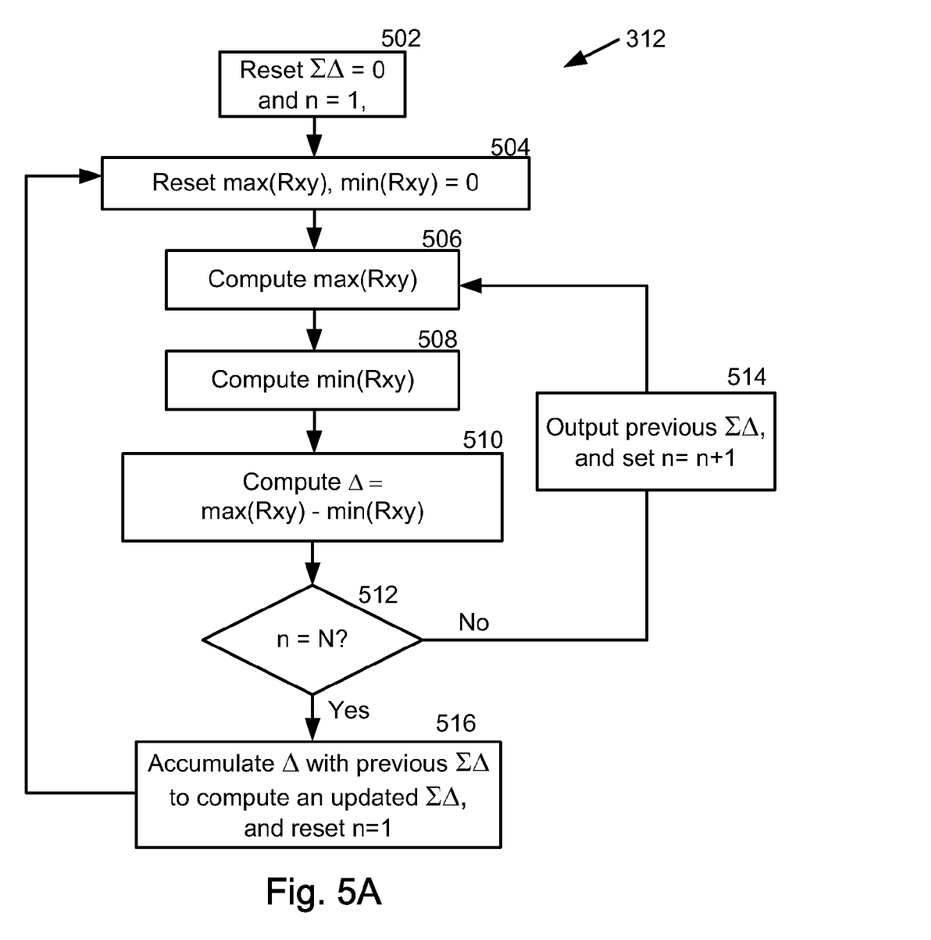
FIG. 5A illustrates a first embodiment of computing an autocorrelation difference value shown in FIG. 3.

FIG. 5A illustrates a first embodiment of operation 312 for computing an autocorrelation difference value shown in FIG. 3. At 502, a sum ΣΔ representing a running autocorrelation difference value is set to zero value, and a counter value n is set to 1. Counter value n ranges from 1 to N, N representing a predefined number of autocorrelation periods over which one running autocorrelation difference value ΣΔ is computed. At 504, each of the maximum and minimum autocorrelation results max(Rxy) and min(Rxy) are set to zero.

At 506, a maximum autocorrelation result max(Rxy) is determined. In an exemplary embodiment, max(Rxy) is computed by comparing the positive autocorrelation results obtained from the present and previous (if any) autocorrelation periods, and selecting the most positive value of those results as the maximum autocorrelation result. The comparison of most positive max(Rxy) results extends over N periods collectively, resetting after an N number of autocorrelation periods has been reached.

At 508, a minimum autocorrelation result min(Rxy) is determined. In an exemplary embodiment, min(Rxy) is computed by comparing the negative autocorrelation results obtained from the present and previous (if any) autocorrelation periods, and selecting the most negative value of those results as the minimum autocorrelation result. The comparison of most negative min(Rxy) results extends over N periods collectively, resetting after an N number of autocorrelation periods has been reached.

At 510, the minimum autocorrelation result is subtracted from the maximum autocorrelation result to compute a delta value Δ. At 512, the n counter is checked if it has reached the predefined count, N. Selection as to the number N can provide flexibility, as N can be made relatively small (e.g., 1, 2, 5, 10 intervals) in order to perform the autocorrelation difference value computation (and consequently, selection of the optimal local C/A code version) in a very fast (i.e., real time) manner, or N can be can be made relatively large (10, 20, 50, 100, 250, 500, 1000, 1,023 intervals) in order to perform the autocorrelation difference value computation (and consequently selection of the optimal local C/A code version) in a relatively slower, but more accurate manner.

If the number of predetermined autocorrelation periods N has not been reached at 512, at 514 the previous running autocorrelation difference value ΣΔ is output, the counter is incremented (exemplary by 1, although in other embodiments it may be a different increment number), and the method returns to 506, at which point new maximum and minimum autocorrelation results are determined and a new delta value Δ is computed based thereon. If the counter has reached N indicating that the predefined number of autocorrelation periods has been performed, 516 is performed whereby the present delta value Δ is accumulated with the previous running autocorrelation difference result ΣΔ to provide an updated running autocorrelation difference result ΣΔ and n is reset to 1 again. The process continues until all autocorrelation periods of the local C/A code version are processed, whereby the running autocorrelation difference result Σ remaining at this point constitutes the autocorrelation difference value Δ(max(Rxy), min(Rxy)) for the particular local C/A code version.

Figure 5B:
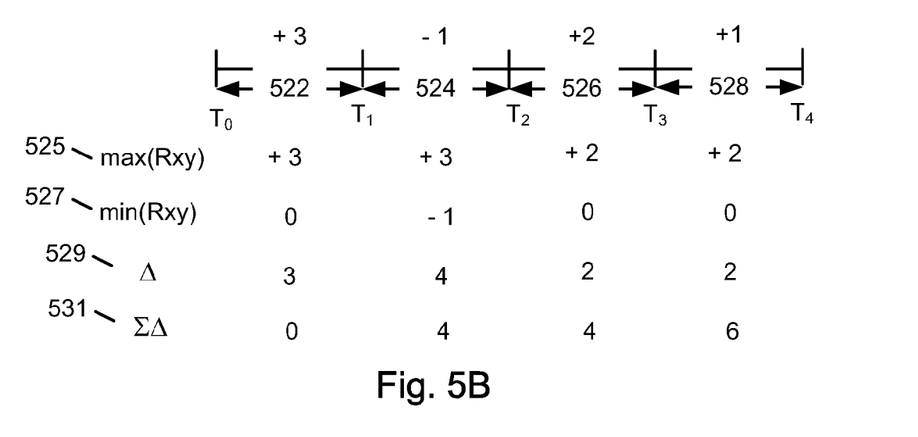
FIG. 5B illustrates the method of FIG. 5A.

FIG. 5B illustrates the method of FIG. 5A. Four autocorrelation periods 522, 524, 526 and 528 are illustrated, each a predefined period in duration, e.g., 1 mS, and the predefined number of periods N for which the running autocorrelation difference value is to be computed is set to 2. The first autocorrelation result corresponding to the first autocorrelation period 522 has a value of +3, the second autocorrelation result has a value of −1, the third autocorrelation result has a value of +2 and the fourth autocorrelation result has a value of +1. The maximum and minimum autocorrelation results 525 and 527, respectively, are shown at the conclusion of each autocorrelation period, along with the delta value Δ529 which is computed based upon the maximum and minimum autocorrelation results 525 and 527, respectively. The running autocorrelation value ΣΔ531 is calculated as described herein.

Upon beginning processing of the first autocorrelation period at 502, the running autocorrelation difference value Σ is set to 0, and the counter n is set to 1. At 504, each of max(Rxy) and min(Rxy) are set to 0. At 506, the maximum autocorrelation result max(Rxy) 525 is determined by comparing the previous quantities max(Rxy) (none, so preset to, e.g., 0) and the present quantity max(Rxy), which in the illustrated case has a value 3. Accordingly, max(Rxy) 525 has a value of 3 corresponding to the autocorrelation result obtained in period 522. At 508, the minimum autocorrelation result min(Rxy) 527 is determined by comparing the previous most negative value (none, so preset to, e.g., 0) to the present negative value (also none as the result for period 522 is positive, so preset to e.g., 0). Accordingly, min(Rxy) 527 has a value of 0. At 510, the delta value Δ 529 representing the difference between max(Rxy) 525 and min(Rxy) 527 has a value of 3.

At 512, a check is made of the value of n, where n=1, and N=2. Therefore, the condition is false. Accordingly, the method continues at 514, where the previous running autocorrelation difference value ΣΔ531 (set to 0 at 502) is output, and the n counter is incremented by 1 (to a value of 2), and the method returns to 506 for further processing during the second autocorrelation period 524.

The result of the autocorrelation over the second autocorrelation period 524 is a value of −1. At 506, the maximum autocorrelation result max(Rxy) is determined as the most positive result over autocorrelation periods 522 and 524, this value being +3. At 508, the minimum autocorrelation result min(Rxy) is determined as the most negative result over autocorrelation periods 522 and 524, this value being −1 obtained at period 524. At 510, the minimum autocorrelation result min(Rxy) is subtracted from the maximum autocorrelation result max(Rxy) to compute a delta value Δ529, this value being +4. At 512, a check of the value of n is compared to N, and in this case the values match (n=2). Accordingly, 516 is performed whereby the present delta value Δ529 (value of 4) is accumulated with the previous running autocorrelation difference value ΣΔ (value of 0), resulting in an updated running autocorrelation difference value of ΣΔ+4 at the end of the second autocorrelation period 524. Further at 516, the counter value n is reset to 1.

The method returns to 504 for the start of the third autocorrelation period 526, whereby the maximum and minimum autocorrelation results are reset to 0. Accordingly, the third and fourth autocorrelation periods 526 and 528 represent the next set of autocorrelation periods over which max(Rxy) 525, min(Rxy) 527, and Δ 529 will be computed.

The result of the autocorrelation over the third autocorrelation period 526 is a value of +2. At 506, the maximum autocorrelation result max(Rxy) 525 is determined by comparing the previous quantities max(Rxy) (none, so preset to, e.g., 0) and the present quantity max(Rxy), which in the illustrated case has a value +2. Accordingly, max(Rxy) 525 has a value of 2. At 508, the minimum autocorrelation result min(Rxy) 527 is determined by comparing the previous most negative value (none, so preset to, e.g., 0) to the present negative value (also none, so preset to e.g., 0). Accordingly min(Rxy) 527 has a value of 0. At 510, the delta value Δ529 representing the difference between max(Rxy) 525 and min (Rxy) 527 has a value of +2. It is to be noted that no previous values for max(Rxy) or min(Rxy) are available at period 526, since these values are reset to 0, and this period represents the first of N periods for calculating these quantities. At 512, a check is made of the value of n, where n=1, and N=2. Therefore, the condition is false. Accordingly, the method continues at 514, where the previous running autocorrelation difference value ΣΔ531 (=+4 following period 525, note that ΣΔ531 is not reset to 0 after each N=2 interval) is output for its value, and the n counter is incremented by 1 (to a value of 2), and the method returns to 506 for further processing during the fourth autocorrelation period 528.

The result of the autocorrelation over the fourth autocorrelation period 528 is a value of +1. At 506, the maximum autocorrelation result max(Rxy) is determined as the most positive result over autocorrelation periods 526 and 528, this value being +2, representing max(Rxy) obtained over autocorrelation period 526. At 508, the minimum autocorrelation result min(Rxy) is determined as the most negative result over autocorrelation periods 526 and 528, this value being 0 for each of autocorrelation periods 526 and 528. At 510, the minimum autocorrelation result min(Rxy) is subtracted from the maximum autocorrelation result max(Rxy) to compute a delta value Δ529, this value being +2. At 512, a check of the value of n is compared to N, and in this case the values match (n=2). Accordingly, 516 is performed whereby the present delta value Δ529 (value of 2) is accumulated with the previous running autocorrelation difference value ΣΔ (value of 4), resulting in an updated running autocorrelation difference value of ΣΔ+6 at the end of the fourth autocorrelation period 528. Further at 516, the counter value n is reset to 1.

This process repeats for all subsequent autocorrelation periods (if any) until the autocorrelation of the particular local C/A code version with the received GPS C/A code completes, and the final value of the running autocorrelation difference value becomes the autocorrelation difference value output from 312 for that particular code version. Each of the local C/A code versions are similar processed, each providing a corresponding autocorrelation difference value. At 314, the autocorrelation difference values are compared to determine which is the largest, and the local C/A code having the largest autocorrelation difference value is selected as the local C/A code for further GPS signal processing at 316.

Figure 6A:
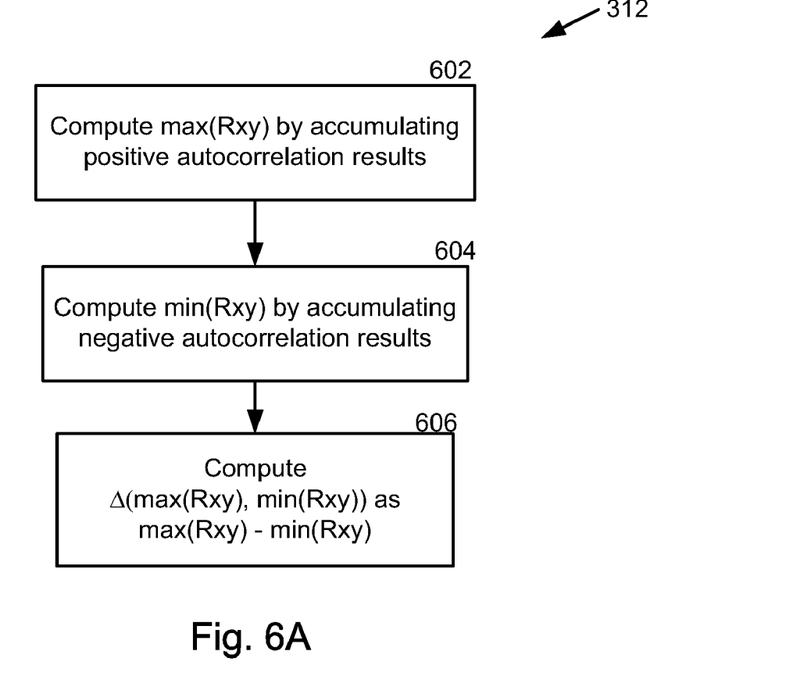
FIG. 6A illustrates a second embodiment of computing an autocorrelation difference value shown in FIG. 3.

FIG. 6A illustrates a second embodiment of the operation 312 for computing an autocorrelation difference value shown in FIG. 3. At 602, a maximum autocorrelation result max (Rxy) is computed, whereby the positive autocorrelation results from the present and previous autocorrelation periods are accumulated. At 604, a minimum autocorrelation result min(Rxy) is computed, whereby the negative autocorrelation results from the present and previous autocorrelation periods are accumulated. At 606, the minimum autocorrelation result min(Rxy) is subtracted from the maximum autocorrelation result max(Rxy) result to compute the autocorrelation difference value for the particular local C/A code.

Figure 6B:
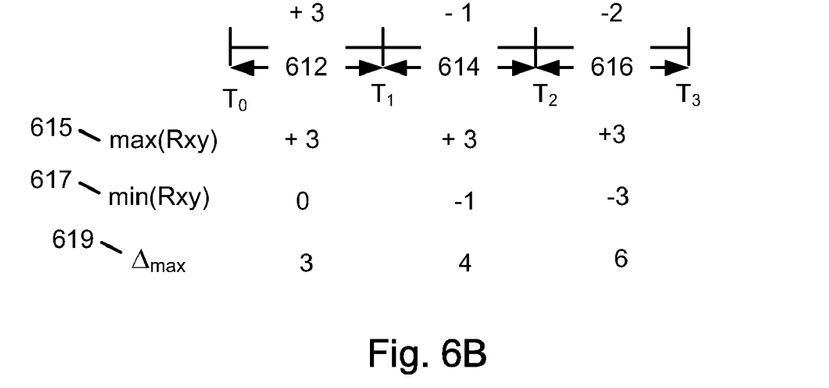
FIG. 6B illustrates the method of FIG. 6A.

FIG. 6B illustrates the method of FIG. 6A. Three autocorrelation periods 612, 614, and 616 are illustrated, each a predefined period in duration, e.g., 1 mS. The first autocorrelation result corresponding to the first autocorrelation period 612 has a value of +3, the second autocorrelation result has a value of −1, and the third autocorrelation result has a value of −2. The maximum and minimum autocorrelation results 615 and 617, respectively, are shown at the conclusion of each autocorrelation period, along with the autocorrelation difference value 619 which is computed based upon the maximum and minimum autocorrelation results 612 and 614, respectively.

At 602, the maximum autocorrelation result max(Rxy) 615 is determined by accumulating the present positive result (+3) with any previous positive result (none, so preset to, e.g., 0), resulting in max(Rxy) 615 having a value of +3. At 604, the minimum autocorrelation result min(Rxy) 617 is determined by accumulating the present negative result (none, so preset to, e.g., 0) with any previous none result (none, so preset to, e.g., 0), resulting in min(Rxy) 617 having a value of 0. At 606, the minimum autocorrelation result min(Rxy) 617 (=0) is subtracted from the maximum autocorrelation result max (Rxy) 615 (=3), resulting in Δ(max(Rxy), min(Rxy)) 619 having a value of 3.

The process repeats for the second autocorrelation period 614, whereby at 602, max(Rxy) 615 is determined by accumulating the past max(Rxy) (=3) with the present max(Rxy) (none, so preset to 0), resulting in max(Rxy) 615 having a value of 3. At 604, min(Rxy) 617 is determined by accumulating the previous min(Rxy) (=0) with the present min(Rxy) (−1), resulting in a min(Rxy) 617 having a value of −1. At 606, the minimum autocorrelation result min(Rxy) 617 (−1) is subtracted from the maximum autocorrelation result max (Rxy) 615 (3), resulting in Δ(max(Rxy), min(Rxy)) 619 having a value of 4.

The process repeats for the third autocorrelation period 614, whereby at 602, max(Rxy) 615 is determined by accumulating the past max(Rxy) (=3) with the present max(Rxy) (none, so preset to 0), resulting in max(Rxy) 615 having a value of 3. At 604, min(Rxy) 617 is determined by accumulating the previous min(Rxy) (=−1) with the present min (Rxy) (−2), resulting in a min(Rxy) 617 having a value of −3. At 606, the minimum autocorrelation result min(Rxy) 617

(−3) is subtracted from the maximum autocorrelation result max(Rxy) 615 (3), resulting in Δ(max(Rxy), min(Rxy)) 619 having a value of 6.

This process repeats for all subsequent autocorrelation periods (if any) until the autocorrelation of the particular local C/A code version with the received GPS C/A code completes, and the final maximum and minimum autocorrelation results are determined. A final autocorrelation difference value for the particular local C/A code version is computed based upon said final maximum and minimum autocorrelation results. At 314, the autocorrelation difference values are compared to determine which is the largest, and the local C/A code having the largest autocorrelation difference value is selected as the local C/A code for further GPS signal processing at 316.

Figure 7A:
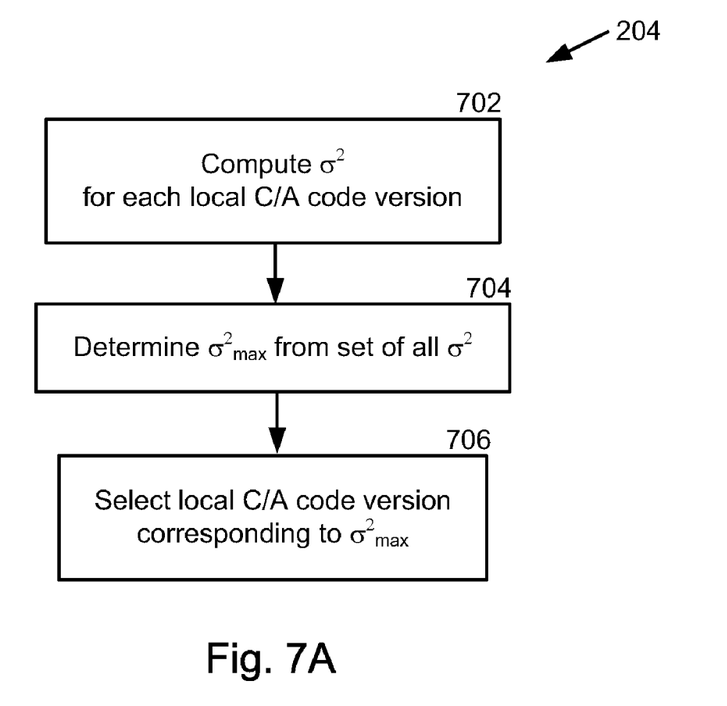
FIG. 7A illustrates a second embodiment of selecting one of a plurality of coarse acquisition code versions shown in FIG. 2.

FIG. 7A illustrates a second embodiment of operation 204 for selecting one of a plurality of coarse acquisition code versions shown in FIG. 2. At 702, an autocorrelation variance value $\sigma^2$ is computed for each local C/A code version, whereby a plurality of autocorrelation variance values $\sigma^2$ are computed. At 704, the largest autocorrelation variance value $\sigma^2_{max}$ from among the plurality of autocorrelation variance values $\sigma^2$ is determined. At 706, the local C/A code version having the largest autocorrelation variance value $\sigma^2_{max}$ is selected.

In one embodiment of the invention, the expected value $E_n$ of the local C/A code version is substantially zero. In such an instance, the autocorrelation variance value $\sigma^2$ obtained for $n^{th}$ autocorrelation period $T_n$ can be computed as follows:

$$\sigma^2 = \sum_{i=1}^{n} \frac{1}{n} [Rxy_n]^2$$

where $Rxy_n$ is the autocorrelation result obtained for the $n^{th}$ autocorrelation period $T_n$, and n represents the total number of autocorrelation periods over which the autocorrelation variance is computed.

Figure 7B:
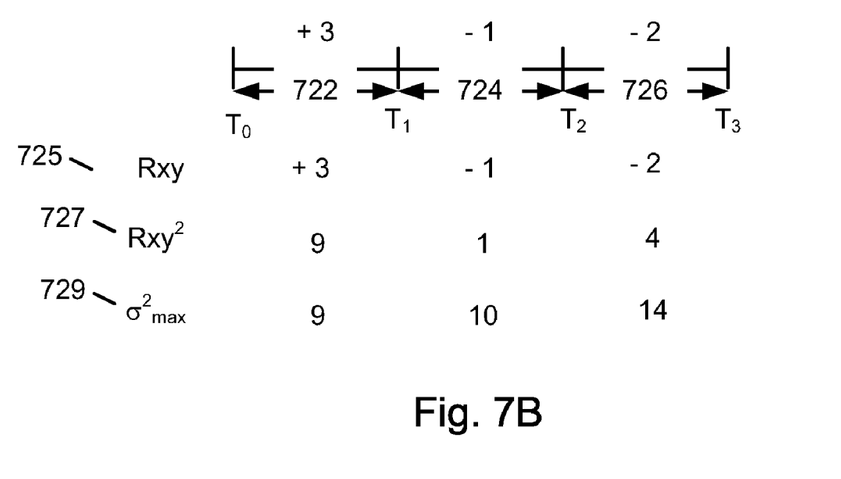
FIG. 7B illustrates the method of FIG. 7A.

FIG. 7B illustrates the method of FIG. 7A. Three autocorrelation periods 712, 714, and 716 are illustrated, each a predefined period in duration, e.g., 1 mS. The first autocorrelation result corresponding to the first autocorrelation period 712 has a value of +3, the second autocorrelation result has a value of −1, and the third autocorrelation result has a value of −2. At the end of the first autocorrelation period 712, the autocorrelation square result 717 is 9 in value. Accordingly, the autocorrelation variance $\sigma^2(719)=\sigma_1^2$, which is 9. The result of the autocorrelation over the second autocorrelation period 714 is a value of −1. Accordingly, the resulting variance $\sigma^2(719)=\sigma_1^2(9)+\sigma_2^2(1)$, which is the sum [9+1], or 10. The result of the autocorrelation over the third autocorrelation period 726 is a value of −2. Accordingly, the resulting variance $\sigma^2(719)=\sigma_3^2+\sigma_2^2+\sigma_1^2$, which is the sum [4+9+1], or 14.

This process repeats for all subsequent autocorrelation periods (if any) until the autocorrelation of the particular local C/A code version with the received GPS C/A code completes, and the final maximum and minimum autocorrelation results are determined. A final autocorrelation variance value for the particular local C/A code version is computed based upon the aforementioned parameters. At 704, the autocorrelation variance values are compared to determine which is the largest, and the local C/A code having the largest autocorrelation variance value is selected as the local C/A code for further GPS signal processing at 706.

In another embodiment of the invention, selection of a particular local C/A code is based upon the maximum and minimum autocorrelation results meeting a predefined criteria and/or threshold. For example, if the autocorrelation difference value of a particular local C/A code version meets or exceeds a predefined quantity, that local C/A code version may be selected and further autocorrelation of different local C/A code versions discontinued. This condition may also be based upon whether a minimum number of local C/A code versions have been processed as well, in order to ensure that the group of tested local C/A code versions is sufficiently large. The predefined quantity may be defined in terms of an absolute quantity, or in terms of a variation from the other autocorrelation difference values. An example of the latter instance is that when an autocorrelation difference value Δ(max(Rxy), min(Rxy)) of more than 30% above the next highest autocorrelation difference value is noted, and when a sufficient number of local C/A code version have been tested (e.g., 50% or more of the available local C/A code versions), then the local C/A code version having a 30% higher autocorrelation difference value is selected as the most optimal local C/A code for further GPS signal processing. Similarly, if one of the local C/A code versions produces an autocorrelation variance value $\sigma^2$ which is above a predefined threshold (absolute or relative, as noted above) and a sufficient number of local C/A code versions autocorrelated (e.g., 50% or more, as noted above), that local C/A code version may be selected without further autocorrelation of the remaining local C/A code versions. Such an arrangement provides significant advantages, in that computing and processing time otherwise used to perform further autocorrelations is saved.

Exemplary in each of the aforementioned methods, the GPS C/A code obtained by the means as described in the aforementioned pending U.S. patent application Ser. No. 11/956,307, the specific description of which is incorporated herein by reference. In one embodiment, the received GPS C/A code is acquired by means of obtaining a GPS snap shot, as described in the aforementioned application. Exemplary of such an embodiment, the received GPS signal is acquired over one C/A acquisition period (e.g., 1 mS), and that signal stored in a memory, such as an sample and hold circuit, as described in FIGS. 3-6 and the corresponding description of the aforementioned application. Further exemplary, the stored signal may be amplified or attenuated in order to combat the potential problem of signal leakage from the sample and hold circuit, as described in FIGS. 6-7C and the corresponding description of the aforementioned application. Alternatively, the received GPS C/A code may be acquired using a delay line, as described in FIG. 8 and the corresponding description of the aforementioned application.

Further exemplary in each of the aforementioned methods, the autocorrelation periods T are approximately 1 mS in duration, and the total length (duration) of the autocorrelation represents a partial autocorrelation, in that fewer than all of the GPS and local C/A code chips are correlated. In a further particular embodiment, the total length of the autocorrelation is determined as a function of the Doppler shift of the GPS signal carrier frequency. In one embodiment, the total length of all autocorrelation periods collectively is preferably 10 mS or less when the Doppler shift of the GPS carrier signal is 100 Hz at maximum. In another embodiment, the total length of all autocorrelation periods collectively is preferably 3 mS or less when the Doppler shift of the GPS carrier signal is 300 Hz at maximum. Generally, the autocorrelation length will increase as the Doppler shift of the GPS carrier signal decreases.

Figure 8:
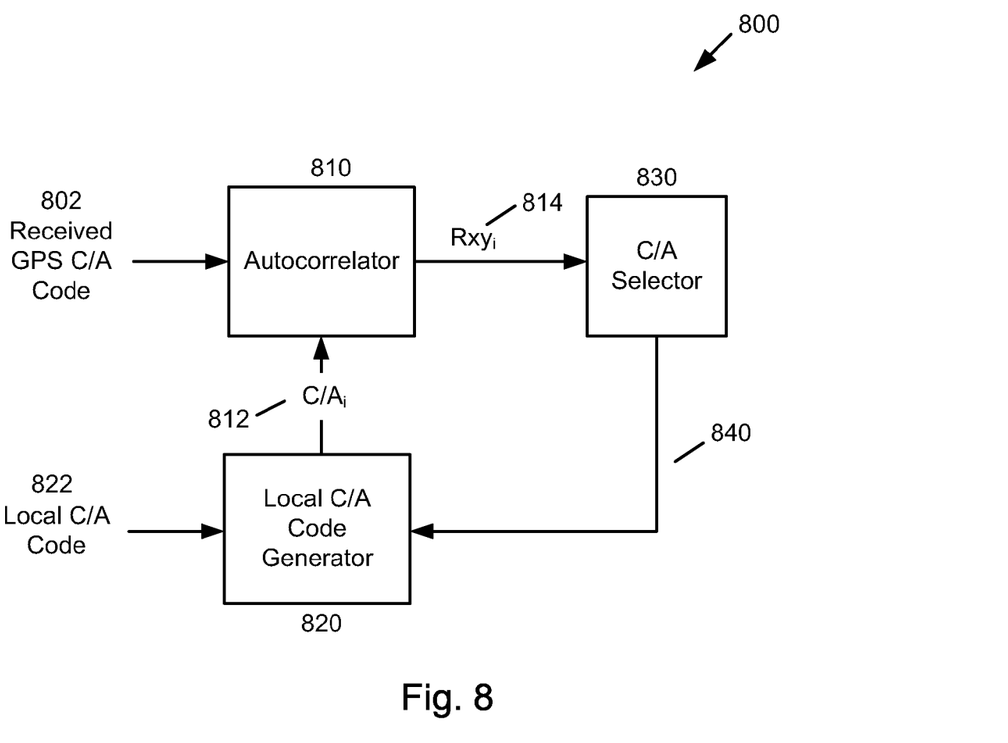
FIG. 8 illustrates a system operable to select a coarse acquisition code for GPS signal processing in accordance with the present invention.

FIG. 8 illustrates system 800 operable to select a coarse acquisition code for GPS signal processing in accordance with the present invention. The system 800 includes a correlator 810 operable to perform autocorrelation of a received GPS C/A code 802 with a plurality of local C/A code versions 812. A local C/A code generator 820 receives a seed local C/A code 822 and therefrom generates a version C/A$_i$ 812 of the local C/A code 822 from 36 possible C/A codes. The generator is made operable to generate one of 36 possible C/A code, with all possible delay versions, for example e.g., 0.1, 0.2, 0.25, 0.5, 0.75, 2, 3, 4, 5, 8, 10, 16, 20, 32, 50, 64, 100, 128, 200, 256, 500, 512, 1000, or 1023 versions of the local C/A code 822. Generation of the different versions may be performed by, e.g., circularly shifting one or more chips within the C/A code. The generator 820 may be located within the system 100 as shown, or it may be located external thereto.

The autocorrelation is performed over a plurality of autocorrelation periods T, each autocorrelation generating an autocorrelation result Rxy$_i$. The autocorrelation results Rxy$_i$ 814 are supplied to a selector 830, which compares and selects from among all of them, a maximum autocorrelation result max(Rxy$_i$) and a minimum autocorrelation result min (Rxy$_i$) for the particular local C/A code version C/A$_i$. This process repeats for one or more local C/A code versions 812 (although not necessarily for all of the available local C/A code versions, as noted above), and the selector 830 selects one of the local C/A code versions based upon the minimum and maximum autocorrelation results of that local C/A code version. Further exemplary, the autocorrelator 810 may be operable (e.g., by internal means, or via an externally-supplied control signal) to limit the number of autocorrelation periods T and/or the duration of each period in order to limit the total autocorrelation length based upon the detected Doppler shift of the GPS carrier frequency.

In a specific implementation, the selector 830 bases selection of a particular local C/A code version on the difference between the version's minimum and maximum autocorrelation results, i.e. quantity $\Delta$(max(Rxy), min(Rxy)) noted above. Exemplary of this implementation, the selector 830 selects the local C/A code which provides the largest difference between the maximum and minimum autocorrelation results, i.e., quantity $\Delta_{max}$(max(Rxy), min(Rxy)) noted above. In another embodiment of this implementation, the selector 830 selects the local C/A code having the largest variance between the maximum and minimum autocorrelation results, i.e. quantity $\sigma^2_{max}$, as noted above. In an alternative embodiment, comparison of autocorrelation results Rxy$_i$ and the identification of maximum and minimum autocorrelation results max(Rxy$_i$), min(Rxy$_i$) thereof occurs within the autocorrelator 810, in which case the autocorrelator outputs these values to the selector 830. Selection of the optimal local C/A code for further GPS signal processing is made by selection signal 840. The system 800 may be implemented in any form, e.g., hardware, software, firmware or a combination of these forms. In a specific embodiment of the invention, one or more of the operations described in the above-described methods may be implemented by means of processing circuitry disposed within a special or general purpose processor unit.

Figure 9:
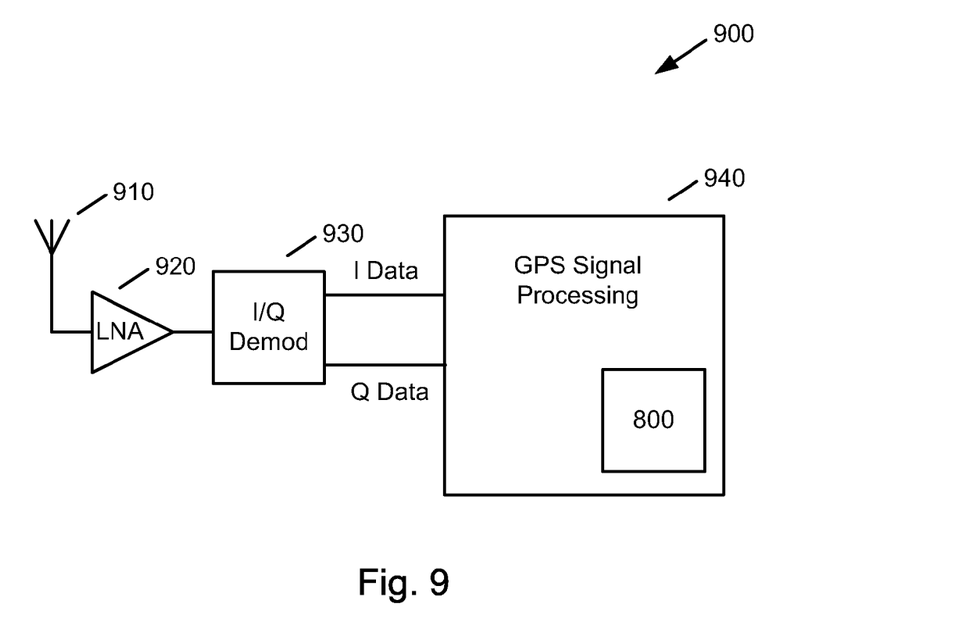
FIG. 9 illustrates a GPS system implementing the system of FIG. 8 in accordance with the present invention.

FIG. 9 illustrates a GPS system implementing the system of FIG. 8 in accordance with the present invention. The GPS system 900 includes an antenna 910 for receiving at least the L1 frequency GPS signal, although the antenna may also be operable to receive the L2 frequency GPS signal (1.2276 GHz) providing the P codes as well. The GPS system 900 further includes a front end amplifier (preferably low noise) 920, an I/Q downconverter 930, and a signal processing block 940. The I/Q downconverter operates to provide quadrature baseband signals 932 and 934, each of which are processed by the signal processing block 940. Signal processing block 940 includes the system 800 shown in FIG. 8 which operates to select the optimal local C/A code for GPS signal processing.

As readily appreciated by those skilled in the art, the described processes may be implemented in hardware, software, firmware or a combination of these implementations as appropriate. In addition, some or all of the described processes may be implemented as computer readable instruction code resident on a computer readable medium, the instruction code operable to program a computer of other such programmable device to carry out the intended functions. The computer readable medium on which the instruction code resides may take various forms, for example, a removable disk, volatile or non-volatile memory, and the like.

The terms "a" or "an" are used to refer to one, or more than one feature described thereby. Furthermore, the term "coupled" or "connected" refers to features which are in communication with each other (electrically, mechanically, thermally, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for selecting a local coarse acquisition (C/A) code for GPS signal processing, the method comprising:
    performing autocorrelation of a received GPS coarse acquisition (C/A) code with a plurality of versions of a local coarse acquisition (C/A) code,
        wherein each local C/A code version is autocorrelated with the received GPS C/A code over a plurality of autocorrelation periods;
        wherein an autocorrelation result is generated for each autocorrelation period, and
        wherein, from among the autocorrelation results of each local C/A code version, a maximum autocorrelation result and a minimum autocorrelation result is determined for each local C/A code version; and
    selecting one of the plurality of local C/A code versions based upon the maximum autocorrelation result and the minimum autocorrelation result thereof, comprising:
        computing an autocorrelation difference value for each local C/A code version, whereby a plurality of autocorrelation difference values are computed, each autocorrelation difference value of a particular local C/A code version comprising a difference between the maximum and minimum autocorrelation values of the particular local C/A code version;
        determining the largest autocorrelation difference value among the plurality of autocorrelation difference values; and selecting the local C/A code version having the largest autocorrelation difference value.

2. The method of claim 1, wherein computing an autocorrelation difference value for a local C/A code version comprises:
- determining a maximum autocorrelation result as the most positive autocorrelation result obtained over a plurality of different autocorrelation periods N;
- determining a minimum autocorrelation result as the most negative autocorrelation result obtained over a plurality of different autocorrelation periods N;
- subtracting the minimum autocorrelation result from the maximum autocorrelation result to compute a delta value; and
- adding the delta value to a running autocorrelation difference value to obtain an updated running autocorrelation difference value, wherein the updated running autocorrelation difference value comprises the autocorrelation difference value of the local C/A code version.

3. The method of claim 1, wherein computing an autocorrelation difference value for a local C/A code version comprises:
- determining a maximum autocorrelation result comprising accumulating a plurality of positive autocorrelation results from the autocorrelation periods;
- determining a minimum autocorrelation result comprising accumulating a plurality of negative autocorrelation results from the autocorrelation periods; and
- subtracting the minimum autocorrelation result from the maximum autocorrelation result to compute the autocorrelation difference value.

4. The method of claim 1, wherein selecting a local C/A code version comprises:
- computing an autocorrelation variance value $\sigma^2$ for each local C/A code version, whereby a plurality of autocorrelation variance values $\sigma^2$ are computed;
- determining a largest autocorrelation variance value $\sigma^2_{max}$ from among a plurality of autocorrelation variance values $\sigma^2$; and
- selecting the local C/A code version having the largest autocorrelation variance value $\sigma^2_{max}$.

5. The method of claim 4, wherein computing an autocorrelation variance value $\sigma^2$ comprises computing an autocorrelation variance value $\sigma^2$ according to the equation:

$$\sigma^2 = \sum_{i=1}^{n} \frac{1}{n}[Rxy_n]^2$$

where $Rxy_n$ is the autocorrelation result for autocorrelation period $T_n$, and where n is a predefined number of autocorrelation periods.

6. The method of claim 1, wherein the predefined number of 1 mS duration autocorrelation periods is a function of a Doppler shift of a carrier frequency of the received GPS C/A code.

7. A system operable to select a coarse acquisition code for GPS signal processing, the system comprising:
- a correlator operable to perform autocorrelation of a received GPS coarse acquisition (C/A) code with a plurality of versions of a local coarse acquisition (C/A) code,
  - wherein each local C/A code version is autocorrelated with the received GPS C/A code over a plurality of autocorrelation periods;
  - wherein an autocorrelation result is generated for each autocorrelation period, and
  - wherein, from among the autocorrelation results of each local C/A code version, a maximum autocorrelation result and a minimum autocorrelation result is determined for each local C/A code version; and
- selection means operable to select one of the plurality of local C/A code versions based upon the maximum autocorrelation result and the minimum autocorrelation result thereof, comprising:
  - means for computing an autocorrelation difference value for each local C/A code version, whereby a plurality of autocorrelation difference values are computed, each autocorrelation difference value of a particular local C/A code version comprising a difference between the maximum and minimum autocorrelation values of the particular local C/A code version;
  - means for determining the largest autocorrelation difference value among the plurality of autocorrelation difference values; and
  - means for selecting the local C/A code version having the largest autocorrelation difference value.

8. The system of claim 7, wherein the means for computing an autocorrelation difference value for a local C/A code version comprises:
- means for determining a maximum autocorrelation result as the most positive autocorrelation result obtained over a plurality of different autocorrelation periods N;
- means for determining a minimum autocorrelation result as the most negative autocorrelation result obtained over a plurality of different autocorrelation periods N means for subtracting the minimum autocorrelation result from the maximum autocorrelation result to compute a delta value; and
- means for adding the delta value to a running autocorrelation difference value to obtain an updated running autocorrelation difference value, wherein the updated running autocorrelation difference value comprises the autocorrelation difference value of the local C/A code version.

9. The system of claim 7, wherein computing an autocorrelation difference value for a local C/A code version comprises:
- means for determining a maximum autocorrelation result comprising accumulating a plurality of positive autocorrelation results from the autocorrelation periods;
- means for determining a minimum autocorrelation result comprising accumulating a plurality of negative autocorrelation results from the autocorrelation periods; and
- means for subtracting the minimum autocorrelation result from the maximum autocorrelation result to compute the autocorrelation difference value.

10. The system of claim 7, wherein the selection means for selecting a local C/A code version comprises:
- means for computing an autocorrelation variance value $\sigma^2$ for each local C/A code version, whereby a plurality of autocorrelation variance values $\sigma^2$ are computed;
- means for determining a largest autocorrelation variance value $\sigma^2_{max}$ from among a plurality of autocorrelation variance values $\sigma^2$; and
- means for selecting the local C/A code version having the largest autocorrelation variance value $\sigma^2_{max}$.

11. The system of claim 10, wherein the means for computing an autocorrelation variance value $\sigma^2$ comprises means for computing an autocorrelation variance value $\sigma$ according to the equation:

$$\sigma^2 = \sum_{i=1}^{n} \frac{1}{n}[Rxy_n]^2$$

where $Rxy_n$ is the autocorrelation result for autocorrelation period $T_n$, and where n is a predefined number of autocorrelation periods.

12. The system of claim 7, wherein the predefined number of 1 mS duration autocorrelation periods is a function of a Doppler shift of a carrier frequency of the received GPS C/A code.

13. A GPS system comprising:
 a coarse selection system, the system comprising:
  a correlator operable to perform autocorrelation of a received GPS signal with a plurality of versions of a coarse acquisition (C/A) code,
   wherein each local C/A code version is autocorrelated with the received GPS signal over a plurality of autocorrelation periods;
   wherein an autocorrelation result is generated for each autocorrelation period, and
   wherein, from among the autocorrelation results of each local C/A code version, a maximum autocorrelation result and a minimum autocorrelation result is determined for each local C/A code version; and
  selection means operable to select one of the plurality of local C/A code versions based upon the maximum autocorrelation result and the minimum autocorrelation result thereof,
   means for computing an autocorrelation difference value for each local C/A code version, whereby a plurality of autocorrelation difference values are computed, each autocorrelation difference value of a particular local C/A code version comprising a difference between the maximum and minimum autocorrelation values of the particular local C/A code version;
   means for determining the largest autocorrelation difference value among the plurality of autocorrelation difference values; and
   means for selecting the local C/A code version having the largest autocorrelation difference value.

14. The system of claim 13, wherein the means for computing an autocorrelation difference value for a local C/A code version comprises:
 means for determining a maximum autocorrelation result as the most positive autocorrelation result obtained over a plurality of different autocorrelation periods N;
 means for determining a minimum autocorrelation result as the most negative autocorrelation result obtained over a plurality of different autocorrelation periods N means for subtracting the minimum autocorrelation result from the maximum autocorrelation result to compute a delta value; and
 means for adding the delta value to a running autocorrelation difference value to obtain an updated running autocorrelation difference value, wherein the updated running autocorrelation difference value comprises the autocorrelation difference value of the local C/A code version.

15. The system of claim 13, wherein the means for computing an autocorrelation difference value for a local C/A code version comprises:
 means for determining a maximum autocorrelation result comprising accumulating a plurality of positive autocorrelation results from the autocorrelation periods;
 means for determining a minimum autocorrelation result comprising accumulating a plurality of negative autocorrelation results from the autocorrelation periods; and
 means for subtracting the minimum autocorrelation result from the maximum autocorrelation result to compute the autocorrelation difference value.

16. The system of claim 13, wherein the selection means for selecting a local C/A code version comprises:
 means for computing an autocorrelation variance value $\sigma^2$ for each local C/A code version, whereby a plurality of autocorrelation variance values $\sigma^2$ are computed;
 means for determining a largest autocorrelation variance value $\sigma^2_{max}$ from among a plurality of autocorrelation variance values $\sigma^2$; and
 means for selecting the local C/A code version having the largest autocorrelation variance value $\sigma^2_{max}$.

17. The system of claim 16, wherein the means for computing an autocorrelation variance value $\sigma^2$ comprises means for computing an autocorrelation variance value $\sigma^2$ according to the equation:

$$\sigma^2 = \sum_{i=1}^{n} \frac{1}{n}[Rxy_n]^2$$

where $Rxy_n$ is the autocorrelation result for autocorrelation period $T_n$, and n is a predefined number of autocorrelation periods.

18. A computer program product, resident of a computer readable medium, operable to provide instructions for selecting a coarse acquisition code for GPS signal processing, the computer program product comprising:
 instruction code to perform autocorrelation of a received GPS signal with a plurality of versions of a coarse acquisition (C/A) code,
  wherein each local C/A code version is autocorrelated with the received GPS signal over a plurality of autocorrelation periods;
  wherein an autocorrelation result is generated for each autocorrelation period, and
  wherein, from among the autocorrelation results of each local C/A code version, a maximum autocorrelation result and a minimum autocorrelation result is determined for each local C/A code version; and
 instruction code to select one of the plurality of local C/A code versions based upon the maximum autocorrelation result and the minimum autocorrelation result thereof, comprising:
  instruction code to compute an autocorrelation difference value for each local C/A code version, whereby a plurality of autocorrelation difference values are computed, each autocorrelation difference value of a particular local C/A code version comprising a difference between the maximum and minimum autocorrelation values of the particular local C/A code version;
  instruction code to determine the largest autocorrelation difference value among the plurality of autocorrelation difference values; and
  instruction code to select the local C/A code version having the largest autocorrelation difference value.

19. The computer program product of claim 18, wherein the instruction code to compute an autocorrelation difference value for a local C/A code version comprises:
  instruction code to determine a maximum autocorrelation result as the most positive autocorrelation result obtained over a plurality of different autocorrelation periods N;
  instruction code to determine a minimum autocorrelation result as the most negative autocorrelation result obtained over a plurality of different autocorrelation periods N
  instruction code to subtract the minimum autocorrelation result from the maximum autocorrelation result to compute a delta value; and
  instruction code to add the delta value to a running autocorrelation difference value to obtain an updated running autocorrelation difference value, wherein the updated running autocorrelation difference value comprises the autocorrelation difference value of the local C/A code version.

20. The computer program product of claim 18, wherein the instruction code to compute an autocorrelation difference value for a local C/A code version comprises:
  instruction code to determine a maximum autocorrelation result comprising accumulating a plurality of positive autocorrelation results from the autocorrelation periods;
  instruction code to determine a minimum autocorrelation result comprising accumulating a plurality of negative autocorrelation results from the autocorrelation periods; and
  instruction code to subtract the minimum autocorrelation result from the maximum autocorrelation result to compute the autocorrelation difference value.

21. The computer program product of claim 18, wherein the instruction code to select comprises:
  instruction code to compute an autocorrelation variance value $\sigma^2$ for each local C/A code version, whereby a plurality of autocorrelation variance values $\sigma^2$ are computed;
  instruction code to determine a largest autocorrelation variance value $\sigma^2_{max}$ from among a plurality of autocorrelation variance values $\sigma^2$; and
  instruction code to select the local C/A code version having the largest autocorrelation variance value $\sigma^2_{max}$.

22. The computer program product of claim 21, wherein the instruction code to compute an autocorrelation variance value $\sigma^2$ comprises instruction code to compute an autocorrelation variance value $\sigma^2$:

$$\sigma^2 = \sum_{i=1}^{n} \frac{1}{n} [Rxy_n]^2$$

where $Rxy_n$ is the autocorrelation result for autocorrelation period $T_n$, and where n is a predefined number of autocorrelation periods.

* * * * *